Aug. 1, 1939.　　　　M. A. LUCE　　　　2,167,763
FRONT END SUSPENSION
Filed June 11, 1938　　　　3 Sheets-Sheet 1

INVENTOR.
MILTON A. LUCE
BY
ATTORNEY.

Aug. 1, 1939.  M. A. LUCE  2,167,763
FRONT END SUSPENSION
Filed June 11, 1938    3 Sheets-Sheet 2

INVENTOR.
MILTON A. LUCE
BY
A. Dunham Owen
ATTORNEY.

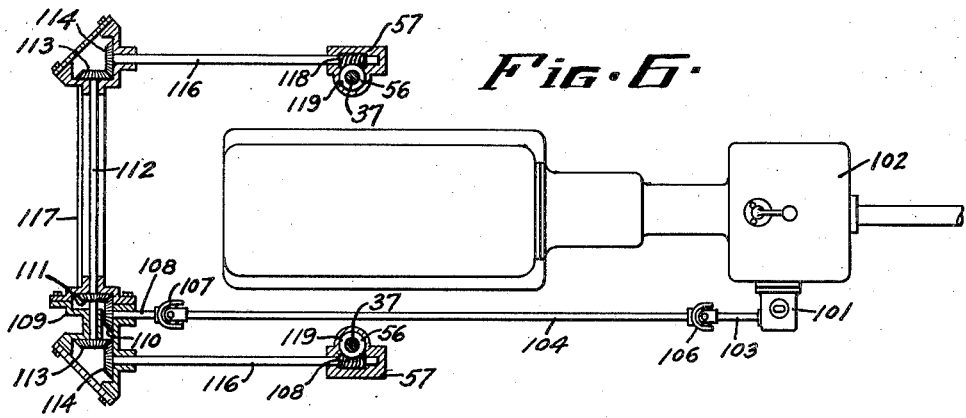
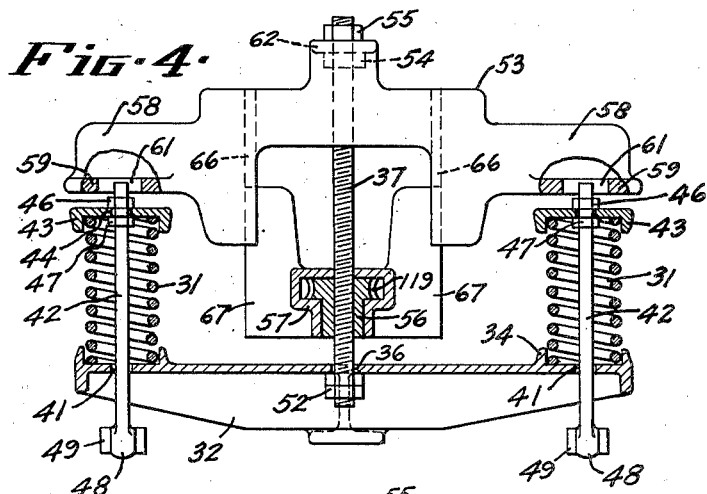
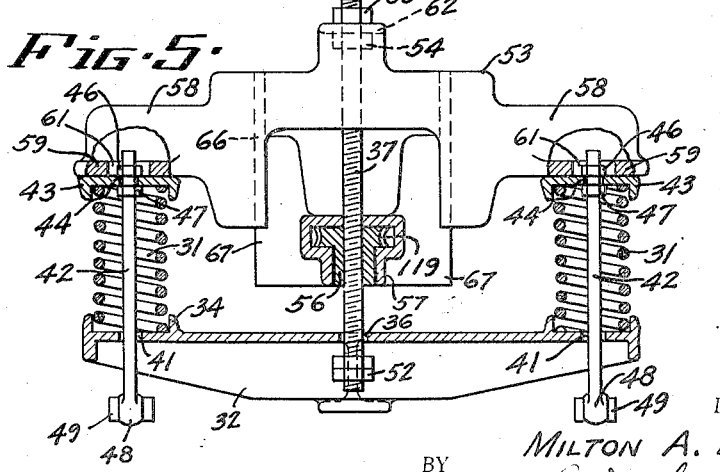
INVENTOR.
MILTON A. LUCE

Patented Aug. 1, 1939

2,167,763

UNITED STATES PATENT OFFICE 2,167,763

FRONT END SUSPENSION

Milton A. Luce, San Francisco, Calif., assignor of one-half to Milton W. Dobrzensky, Oakland, Calif.

Application June 11, 1938, Serial No. 213,216

3 Claims. (Cl. 105—215)

My invention relates to multi-wheel vehicles and particularly to the type having provision for operation on the highways or on rails.

An object of my invention is to provide in a vehicle adapted for operation either on the road or on rails, means whereby when the front road wheels are retracted and the rear road wheels are retracted, the rail wheels will support the truck frame substantially parallel with the rails and conversely when the road wheels are on the road and the rail wheels are retracted, there will be an equal distance between the truck frame and the road, with the result that the truck will be substantially level at all times; to provide in such a combination vehicle a construction whereby the pony truck carrying the rail wheels is all sprung weight when the vehicle is running on its road wheels; to provide in a vehicle of this type a front end suspension which gives a maximum road clearance, particularly when running on the road wheels; and to provide a mechanism employing the same springs in different positions for both the road and rail suspensions.

The advantages accruing from my invention will be manifest to the man skilled in this art. For instance, one of the big problems in designing front end suspension for vehicles adapted to operate on rails or on the highway is to secure sufficient road clearance when the pony truck or other frame supporting the rail wheels is retracted. When the vehicle is operating on the rails, the clearance is not a particularly important matter, but in road operation with such a vehicle, especially where used in lumbering operations, over badly rutted roadways, it is important that the rail wheels and their suspension frame should be lifted as high above the road as possible. Therefore, one of the important objects of the present invention is to provide a combination highway and railroad vehicle having ample road clearance regardless of which type of wheels are in use.

Another advantage of my invention is the fact that instead of suspending the pony truck from the front road wheel axle as has been the general practice, my invention contemplates that it will be suitably secured to the frame of the vehicle, with the result that all the rail wheel mechanism, when the vehicle is being operated on its road wheels, will be sprung weight.

Another important advantage gained by my invention relates to the matter of keeping the truck bed level regardless of whether it is running on the road or on rails. In devices of this type the general practice heretofore has been for the rear rail wheels to support the rear of the truck at substantially the same height as did the road wheels, whereas the front rail wheels when in use have tended to lift the front end of the truck and support it higher than when the road wheels were in use. By means of this present invention it is possible to arrange the road wheels and the rail wheels so that when either set is in use, the truck frame will be at substantially the same position with respect to the ground as when using the other set.

A further advantage of this invention is that it makes possible the use of the same set of springs to produce the required stiff spring action between the chassis and the rail wheels, and the necessary soft spring action between the chassis and the road wheels.

A further advantage of this invention resides in the reduction in number of necessary parts, made possible by utilizing the same mechanism for retracting and extending both rail wheels and road wheels.

The invention possesses other objects and features of advantage, some of which, with the foregoing, will be set forth in the following description of a preferred form of my invention which is illustrated in the drawings accompanying and forming part of the specification. It is to be understood that I do not limit myself to the showing made by the said drawings and description, as I may adopt variations of the claims.

Referring to the drawings:

Fig. 4 is an enlarged detail view in longitudinal, vertical section, taken upon the line IV—IV of Fig. 2 with the direction of view as indicated;

Fig. 5 is a view similar to Fig. 4 taken upon the line V—V of Fig. 3 with the directional view as indicated; and Fig. 6 is a horizontal sectional view taken through the housing, showing the drive for actuating the elevating and lowering mechanism. This figure may be considered to have been taken upon the line VI—VI of Fig. 2, with the direction of view indicated.

Figure 1:
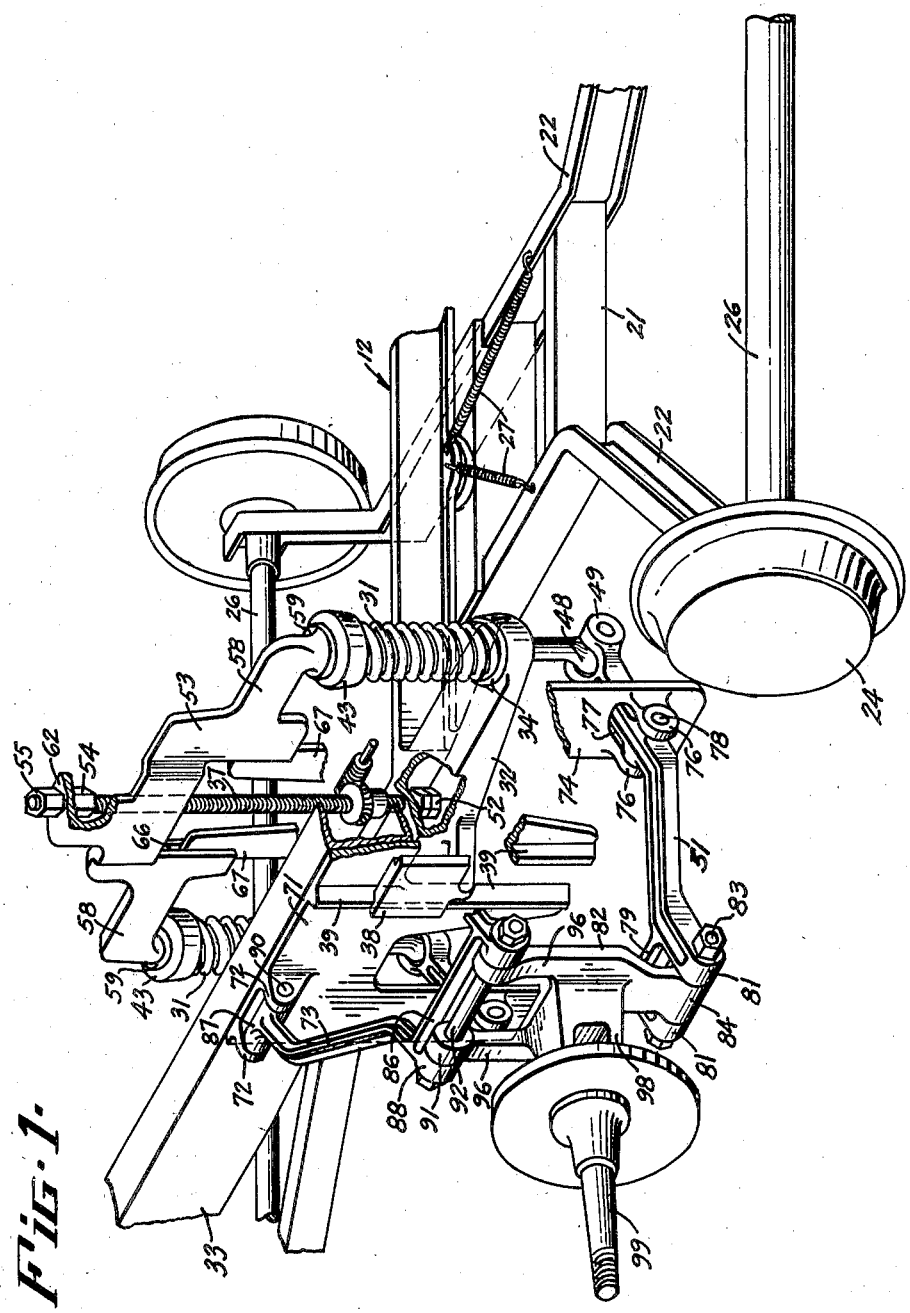
Fig. 1 is a perspective view of a portion of the running gear and supporting elements of the under carriage of a convertible vehicle incorporating the principles of the present invention. Portions of the device are broken away and the road wheels are not shown, for the sake of clarity.

My invention may be adapted for installation on a conventional motor vehicle as accessory thereto, or may be built into said vehicle as original equipment.

The embodiment of the invention herein described and illustrated shows two sets of running gear, a pony truck for operating the vehicle on rails or steel tracks, and the conventional set of road wheels for operating the vehicle on roads or highways. Unitary means are provided for simultaneously lowering the road wheels to their normal operative position and retracting the rail wheels, and vice versa. A preferred arrangement of elements is herein described whereby are provided normal road clearances when using either set of running gear and the chassis is supported at its original height and inclination with respect to the road.

As will become clear from the present description, the mechanisms for supporting and adjusting the rail wheels and the road wheels are arranged with numerous elements in common which operate and cooperate to clearly attain all the improvements and advantages herein claimed.

The carriage 10 which supports the front end of the vehicle when operated on rails comprises a pony truck 11 pivotally attached at its center to an auxiliary frame 12 by a suitable bearing having cooperating bosses on the truck 11 and frame 12, respectively, and a king bolt 16. Concentric with and spaced from the bosses 13 and 14 are abutting lugs 17 and 18 engaging each other to restrain the vehicle against swaying when operating on the rail wheels, and to restrain the pony truck against rocking on its pivot when in its retracted position. Lugs 17 and 18 are free to slide relative to each other in a horizontal plane when the axle turns on king bolt 16 in rounding a curve.

The cross member 21 of the pony truck 11 which engages the king bolt 16 extends between the side frames 22, and is rigidly joined thereto. The side frames 22 are preferably U-shaped, and of sufficient length to allow ample room for the full free swing of the road wheels 23 on the steering knuckles. A suitable number of cross members may be employed to provide a rigid frame for the pony truck. Rail wheels 24, spaced apart at the desired gauge, are rotatably mounted on the ends of horizontal shafts 26, one of which is suitably journalled at each end of the pony truck 11. Springs 27 yieldably secure the pony truck 11 against rotation on its pivot when elevated, but permit that degree of turning of the pony truck necessary for operation upon rails. Preferably the rail wheels are provided with a well-known type of brake operated by connection with any suitable brake actuating mechanism (not shown).

Figure 2:
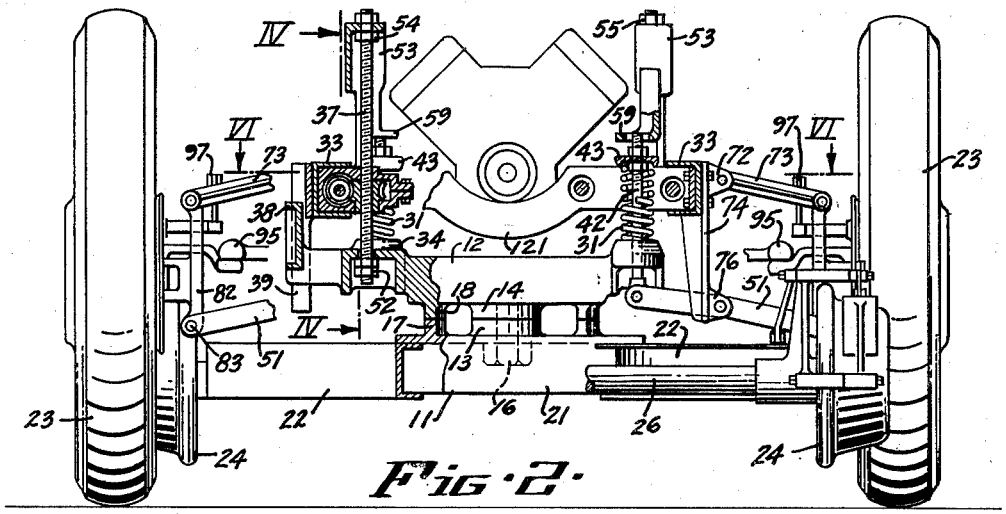
Fig. 2 is a view in front elevation partially broken away and shown in section. The parts are shown in the positions assumed thereby when the road wheels are operative.

The auxiliary frame 12, preferably a single casting, provides a means for yieldably supporting one end of the vehicle on the pony truck 11, and also a means for hoisting the pony truck to its retracted position as shown in Fig. 2. As will presently be described, the auxiliary frame 12 also provides a substantially rigid support for springs 31 when the auxiliary frame 12 is in its hoisted position.

The auxiliary frame 12 includes a pair of spaced parallel arms 32 extending (see Fig. 1) horizontally forward and backward, said arms being substantially parallel to the side frames of the chassis 33. At the outer ends of arms 32 adjacent their upper surfaces and preferably integral therewith, are circular bosses 34 within which the springs 31 seat. The springs 31 are preferably of the coil or helical type and at least four in number and carry the entire load imposed by the chassis at all times, as will be more clearly described in the section on operation. At the center of each arm 32 an opening 36 is provided, and a threaded jack rod 37 extends through each opening 36, ample clearance being provided to permit the jack rods to slide freely through the openings.

The auxiliary frame 12 is freely movable in a substantially vertical direction with respect to the chassis, but is restrained from turning or shifting endwise or sidewise on the chassis by guide blocks 38 (see Fig. 1) rigid with the auxiliary frame 12 and slidably engaging vertical guides 39, secured to the chassis frame 33. The auxiliary frame 12 is also provided with a slot 41 adjacent the center of each spring seat 34, and through which rod 42 extends. The springs 31 are arranged with their longitudinal axes substantially vertical. The upper ends of the springs 31 are engaged by spring caps 43 (see Figs. 4 and 5), each having a peripheral flange extending downward and engaging the first coil of each spring.

Adjacent their centers the spring caps 42 are provided with openings 44 through which the rods 42 extend. These rods 42 extend axially through the springs 31, and have the spring caps 43 secured to their upper ends at the properly adjusted height by means of lock nuts 46 and 47. Each rod is provided at its lower end with an eye 48 which is in pivotal engagement with a bifurcation 49 at one end of a lever or rocker arm 51, the latter being pivoted at 78 in depending frame 74.

Power means for simultaneously raising one set of running gear and lowering the other is provided by two jacks, one disposed on each side of the vehicle, preferably adjacent the inside flanges of the associated longitudinal frame member of the chassis 33. Each of the jacks comprises the rod 37, previously referred to, which serves as a jack screw and is preferably threaded full length. The lower end of each rod 37 extends through an opening 36 in the auxiliary frame as previously described, and carries nuts 52 which are locked thereon at properly adjusted height, but which are not attached to the auxiliary frame 12. At its upper end each rod 37 engages a yoke 53 to which it is rigidly clamped by clamp nuts 54 and 55. Each rod 37 is equipped with a nut 56 threaded thereon, and rotatably supported in a gear housing 57 on the chassis frame 33.

Each yoke 53 has two horizontally disposed arms 58, the outer end of each of which has a downwardly facing flange 59 overlying the associated spring cap 43. The flanges 59 are provided with openings 61 through which the nuts 46 on the upper ends of rods 42 freely pass (see Figs. 4 and 5) thereby allowing the flanges 59 to engage the spring caps 43. Another integral flange 62 disposed centrally of each yoke 53 is clamped between nuts 54 and 55 respectively, rigidly securing the jack rod 37 to the yoke. The yoke 53 is provided with guide grooves 66 (see Fig. 1) which engage the vertical guides 67 on the chassis 33, thereby maintaining true alignment between the yoke 53 and the associated springs 31, and permitting vertical adjustment of the yoke 53.

A bracket plate 71 is rigidly mounted on each side of the chassis 33 (see Fig. 1) and adjacent the upper corners of the plate 71 and integral therewith are two pairs of axially aligned eye brackets 72, each pair having pivoted thereto one end of a link 73. At the ends of the plate 71 narrow portions 74 extend below the chassis frame 33 to provide supports for two pairs of axially aligned eyes 76, each pair engaging one of the rocker arms 51 previously mentioned. Each rocker arm 51 extends through an opening 77 between the associated eyes 76 and freely rocks therein, being supported intermediate its ends on a pin 78.

The rocker arms 51 are joined adjacent their outer ends by a connecting web 79. The outer end of each rocker arm 51 terminates in an eye 81, and the road wheel bracket 82 is pivotally joined to both eyes 81 by a single pin 83 extending through them and an eye 84 on the lower end at the bracket 82.

The links 73 are integrally connected by the cross brace 86 (see Fig. 1) and each has eyes 87 and 88 at its inner and outer ends, respectively. The eyes 87 on the inner ends of the links 73 are pivotally supported between the eye brackets 72 on axially aligned pins 90. The eyes 88 on the outer ends of the links 73 are also in axial alignment and are pivotally connected to aligned eyes 91 on the upper edge of the road wheel bracket 82 as by a pin 92 common to both outer eyes 88.

Wide spacing of the pivots joining the rocker arms 51 and the links 73 to the plate 71 contributes to the stability with which the road wheel bracket 82 is supported.

Figure 3:
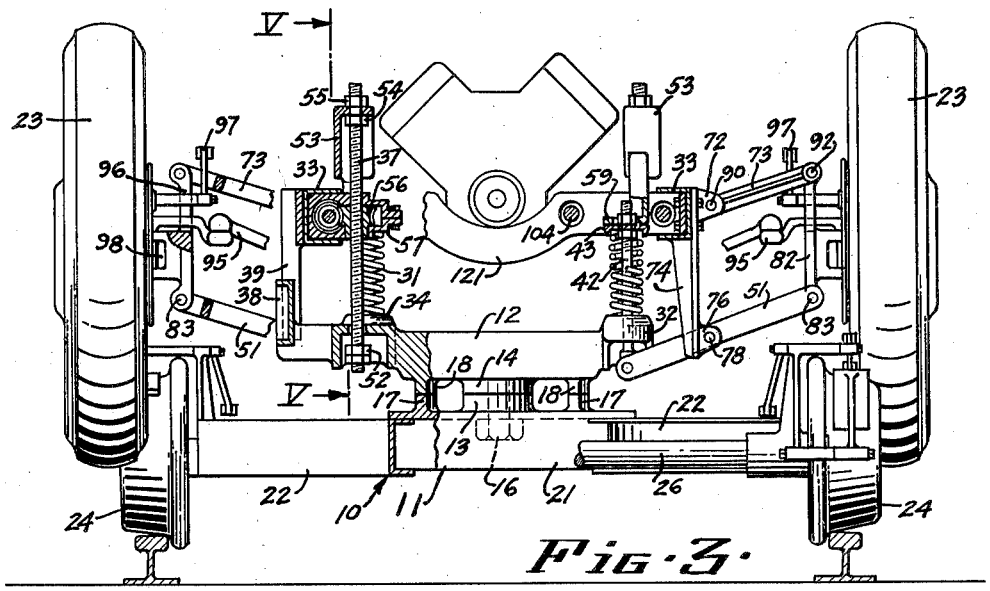
Fig. 3 is a view similar to Fig. 2 showing the road wheels elevated and the rail wheels in operative position.

It is also requisite that in its translatory motion the road wheel bracket 82 be maintained vertical at all times. For this purpose the parts are so proportioned and arranged that the plane in which the two links 73 lie is parallel to the plane in which the two rocker arms 51 lie. Hence, as viewed from the front of the vehicle as in Figs. 2 and 3 (using the right hand road wheel suspension), if the four pivots 78, 83, 90 and 92 are assumed to be the corners of a quadrilateral, the figure formed by lines interconnecting them would be a parallelogram regardless of the position assumed by the bracket 82, and the road wheel bracket 82 will remain substantially vertical, though it is free to move up and down in translatory motion.

The upward extensions 96 of the bracket 82 on which the eyes 91 are disposed are spaced a sufficient distance apart to permit conventional brake mechanism 97 and steering arm 95 to extend between. A suitable tie rod connects the steering spindles for simultaneous operation. At its outer end the bracket 82 is bifurcated as at 98 to engage the steering hub (not shown) and pivotally supports the hub in the usual manner. The steering hub, road wheel 23, road wheel bearings (not shown), and the spindle unit 99 are preferably the parts originally provided on the vehicle in the event my device is installed as an accessory. The brake mechanism 97 is also preferably of the conventional type suitably connected to such brake actuating devices as are originally on the vehicle.

Referring to Fig. 6, a suitable commercial type of supplementary power take-off 101 is mounted on the transmission 102. At the will of the operator the power take-off may be brought into engagement with the motor drive means by the standard shifting devices, thereby providing power means for actuating worm thrust gears 56.

The power thus supplied is preferably transmitted to the worm thrust gears 56 by such an arrangement as illustrated in Fig. 6. The power take-off shaft 103 is coupled to a shaft 104 by a universal coupling 106. A second universal coupling 107 connects shaft 104 to the short gear shaft 108 journaled in the housing 109 and extended therethrough having bevel gear 110 secured on its end.

A bevel gear 111 secured on a transverse shaft 112 intermediate the ends thereof is in continuous mesh with the gear 110. On the ends of the shaft 112 are rigidly mounted the bevel gears 113 which are in constant mesh with bevel gears 114, each of which is affixed to the forward end of a shaft 116, which extends into both of the housings 117 and 57 respectively, and are journaled therein. Keyed to the rear ends of shafts 116 are the worm screws 118 which mesh with their respective worm gear teeth 119, which are formed on the outer peripheries of the nuts 56. Inner faces of the housings 57 adjacent the ends of the worm screws 118 provide suitable thrust bearings therefor.

The gear housing 117 is arranged horizontally and preferably ahead of the radiator at substantially the height of the chassis 33 upon which it is rigidly supported. Where necessary, a cross frame member 121 may be rigidly attached to the chassis 33 between the plates 71 to absorb excessive torsional strains which might otherwise be imposed upon the chassis.

More particular consideration will now be given to the operation of the described mechanism.

By the expedient of the two identical power jacks 37, 56, one on either side of the vehicle, means are provided for optionally supporting the vehicle on a highway with the rail wheels suspended well above the road, or the adjustment may as conveniently be reversed so as to retract the road wheels and support the vehicle on the rail wheels. These wheels have supporting means arranged for a see-saw action. Also, the mechanism in either adjustment will provide the normal amount of resiliency necessary to smooth riding.

Assuming that the mechanism is initially adjusted to support the vehicle on its road wheels with its rail wheels retracted (see Figs. 2 and 4), the auxiliary carriage 12 will be in its uppermost position supported on the nuts 52. In this position the pony truck 11 is suspended above the road a sufficient distance to afford substantially the maximum standard road clearance.

So disposed, the auxiliary frame 12 is supported on the chassis 33 between the guides 39 and on the jack rods 37 so as to provide a substantially rigid support for the lower end of springs 31. In other words, looking at Fig. 4, the jack screw 37 has lifted auxiliary frame 12 to support springs 31 from the bottom and simultaneously has lifted yokes 53 away from the tops of these springs.

The point at which the weight of the vehicle may for convenience be considered to be supported when on the road wheels is at the fulcrums 78 about which the rocker arms 51 swing. The outer ends of the rocker arms 51, being connected to the road wheels, cannot yield to the weight of the vehicle. Therefore, the downward force on the rocker arms 51 at the fulcrum 78 imposed thereon by the weight of the vehicle causes the inner ends of the rocker arms 51 to swing down unless prevented from doing so by the springs 31. The load imposed by the vehicle at the fulcrums 78, may, therefore, be said to be transferred to the springs 31 by means of the rods 42, which are pivotally pinned at their lower ends to the rocker arms 51 and are supported on the spring caps 43 attached to their upper ends. The force on rods 42 being downward, the springs 31 are thereby compressed, and the jack rods 37 are in tension.

With the springs 31 so compressed and the jack rods 37 in their uppermost position, the flanges 59 of yokes 53 will be disengaged from the spring caps 43 and will permit upward movement thereof. When properly adjusted, the distance between the adjacent surfaces of the flanges and spring caps should permit the springs to elongate until substantially relaxed, but no more. The rocker arms 51 are therefore resiliently supported at their inner ends by springs 31, thus resiliently supporting the vehicle upon the road wheels 23.

To further illustrate the operation of the mechanism, suppose it is desired to discontinue transportation by road and transport the vehicle on rails. The operator will then manœuvre the vehicle to a suitable station, bringing it to rest with the chassis parallel to the rails and with the rail wheels directly over the tracks.

With the motor of the vehicle running to furnish power to the jacks, the operator will shift the proper levers to bring the motor into engagement with the power take-off 101. By making the proper gear selection, the direction of rotation of the power take-off shaft 103 will drive the jack screws 37 in the desired direction, which in this case is downward. This should be continued until the rods 37 have reached their lowermost position (see Fig. 5).

As the rods 37 move downward, the auxiliary frame 12, carried on nuts 52, will move downward until the wheels 24 of the pony truck 11, mounted thereon, rest on the tracks. At this point the jack rods 37 will be in an intermediate position.

As the rods 37 continue to move downward, the nuts 52 drop away from beneath auxiliary frame 12, leaving it thereafter supported solely on the pony truck at a fixed height above the tracks, as determined by the size of the rail wheels 24. At the halfway point, the road wheels continue to partially support the vehicle, until the continued downward movement of the rods 37, to which the yokes 53 are attached, brings the flanges 59 of the yokes 53 into engagement with the spring caps 43. This movement continues until the springs 31 support the load on the pony truck 11, through the yokes 53. This same movement causes the road wheels to be lifted by means of the spring caps 43 which support rods 42 by nuts 47. The inner ends of rocker arms 51 are connected thereto, and as rods 42 are lowered, the outer ends of rocker arms 51 are elevated.

The change-over from one set of wheels to the other is capable of accomplishment with no substantial resultant variation in elevation of the associated portion of the vehicle chassis. The importance of this feature is that the vehicle does not have to be operated at an abnormal angle as in the case of prior existing devices. The slight upward movement of the chassis compensates for a similar amount of downward movement during the first part of the adjustment.

To change from rail to road operation, it is but necessary to operate the power take-off in the opposite direction, and the operation just described will be reversed, lowering the road wheels 23 into operating position, and raising the rail wheels 24 into retracted position.

Briefly summarized, the spring suspension when on the road wheels is through levers 51 supported by springs 31 as shown in Fig. 4; and when on the rail wheels it is through the same springs interposed between auxiliary frame 12 and yoke 53. Thus, the same springs serve a dual purpose and give the type of spring action most desirable for each type of operation.

While I have shown my device adapted as the steering means on the vehicle, it is equally applicable for use where the steering feature is not required, in which case the spindle 99 will be integral with bracket 82. Such an installation might be used on a trailer.

Also, my device may be adapted for the drive unit on a road rail vehicle and still employ the features of my invention.

What I claim is:

1. In a vehicle of the character described, a chassis frame, a carriage adjustably mounted thereon, wheels journalled upon said carriage, resilient means carried by said carriage, elevating and lowering mechanism comprising a nut rotatably mounted upon said frame and a jack rod threaded therethrough and connected to said carriage, whereby said carriage can be raised and lowered by turning said nut, means supported on said jack rod adapted for engagement with said resilient means when said carriage is lowered, means providing a fulcrum rigid with said frame, a lever pivoted intermediate its ends to said fulcrum, a bracket pivoted to the outer end of said lever, a link parallel to said lever and pivoted at one end to said frame and at its other end to said bracket to guide said bracket in vertical translatory motion with respect to said frame, a wheel journalled on said bracket, a support for one end of said resilient means, and means connecting said support to the other end of said lever whereby road shock imparted to said bracket wheel is transmitted to said resilient means and whereby said bracket is raised when said carriage is lowered.

2. In a vehicle of the character described, a chassis frame, a carriage adjustably mounted thereon, wheels journalled upon said carriage, resilient means carried by said carriage, elevating and lowering mechanism for said carriage means thereon for engagement with said resilient means when said carriage is lowered, means providing a pair of spaced, axially aligned fulcrums rigid with said frame, a lever associated with each of said fulcrums and pivoted intermediate its ends thereto, a floating bracket, axially aligned pivots connecting the outer ends of said levers to said bracket, a link pivoted at one end to said frame and at its other end to said bracket, both pivots of said link lying in a plane parallel to that which includes all said pivots of said levers, whereby said bracket is guided in substantially vertical translatory movement with respect to said frame, a wheel journalled on said bracket, caps resting on said resilient means, and means connecting each of said levers at its other end to one of said caps whereby road shock imparted to said bracket wheel is transmitted to said resilient means and whereby said bracket is raised when said carriage is lowered.

3. In a vehicle of the character described, a chassis frame, a carriage adjustably mounted thereon, wheels journalled upon said carriage, resilient means carried by said carriage, elevating and lowering mechanism comprising a nut rotatably mounted upon said frame and a jack rod threaded therethrough and connected to said carriage, whereby said carriage can be raised and lowered by turning said nut, means supported on said jack rod adapted for engagement with said resilient means when said carriage is lowered, means providing a fulcrum rigid with said frame, a lever pivoted intermediate its ends to said fulcrum, a bracket pivoted to the outer end of said lever, a link parallel to said lever and pivoted at one end to said frame and at its other end to said bracket to guide said bracket in vertical translatory motion with respect to said frame, a wheel journalled on said bracket, a supporting cap for one end of said resilient means, and means connecting said cap to the other end of said lever whereby road shock imparted to said bracket wheel is transmitted to said resilient means and whereby said bracket is raised when said carriage is lowered, the connection of said jack rod to said carriage being severed as said carriage is lowered and its continued movement effecting the engagement between said resilient engaging support means on said jack rod.

MILTON A. LUCE.